United States Patent
Hughes et al.

(10) Patent No.: US 10,114,651 B2
(45) Date of Patent: Oct. 30, 2018

(54) GATHERING AND SCATTERING MULTIPLE DATA ELEMENTS

(71) Applicants: Christopher J. Hughes, Santa Clara, CA (US); Yen-Kuang (Y. K.) Chen, Palo Alto, CA (US); Mayank Bomb, Hillsboro, OR (US); Jason W. Brandt, Austin, TX (US); Mark J. Buxton, Chandler, AZ (US); Mark J. Charney, Lexington, MA (US); Srinivas Chennupaty, Portland, OR (US); Jesus Corbal, King City, OR (US); Martin G. Dixon, Portland, OR (US); Milind B. Girkar, Sunnyvale, CA (US); Jonathan C. Hall, Hillsboro, OR (US); Hideki (Saito) Ido, Sunnyvale, CA (US); Peter Lachner, Heroldstatt (DE); Gilbert Neiger, Portland, OR (US); Chris J. Newburn, South Beloit, IL (US); Rajesh S. Parthasarathy, Hillsboro, OR (US); Bret L. Toll, Hillsboro, OR (US); Robert Valentine, Kiryat Trvon (IL); Jeffrey G. Wiedemeier, Austin, TX (US)

(72) Inventors: Christopher J. Hughes, Santa Clara, CA (US); Yen-Kuang (Y. K.) Chen, Palo Alto, CA (US); Mayank Bomb, Hillsboro, OR (US); Jason W. Brandt, Austin, TX (US); Mark J. Buxton, Chandler, AZ (US); Mark J. Charney, Lexington, MA (US); Srinivas Chennupaty, Portland, OR (US); Jesus Corbal, King City, OR (US); Martin G. Dixon, Portland, OR (US); Milind B. Girkar, Sunnyvale, CA (US); Jonathan C. Hall, Hillsboro, OR (US); Hideki (Saito) Ido, Sunnyvale, CA (US); Peter Lachner, Heroldstatt (DE); Gilbert Neiger, Portland, OR (US); Chris J. Newburn, South Beloit, IL (US); Rajesh S. Parthasarathy, Hillsboro, OR (US); Bret L. Toll, Hillsboro, OR (US); Robert Valentine, Kiryat Trvon (IL); Jeffrey G. Wiedemeier, Austin, TX (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/862,407

(22) Filed: Jan. 4, 2018

(65) Prior Publication Data
US 2018/0129506 A1 May 10, 2018

Related U.S. Application Data

(63) Continuation of application No. 13/898,189, filed on May 20, 2013, which is a continuation of application
(Continued)

(51) Int. Cl.
G06F 9/00 (2006.01)
G06F 12/08 (2016.01)
(Continued)

(52) U.S. Cl.
CPC ........ *G06F 9/3861* (2013.01); *G06F 9/30036* (2013.01); *G06F 9/30043* (2013.01)

(58) Field of Classification Search
None
See application file for complete search history.

(56) References Cited

U.S. PATENT DOCUMENTS 4,589,065 A 5/1986 Auslander et al.
4,881,168 A 11/1989 Inagami et al.
(Continued)

OTHER PUBLICATIONS

Advisory Action from U.S. Appl. No. 13/250,223, dated Sep. 10, 2015, 3 pages.
(Continued)

Primary Examiner — Hyun Nam
(74) Attorney, Agent, or Firm — Nicholson De Vos Webster & Elliott LLP

(57) ABSTRACT

According to a first aspect, efficient data transfer operations can be achieved by: decoding by a processor device, a single
(Continued)

instruction specifying a transfer operation for a plurality of data elements between a first storage location and a second storage location; issuing the single instruction for execution by an execution unit in the processor; detecting an occurrence of an exception during execution of the single instruction; and in response to the exception, delivering pending traps or interrupts to an exception handler prior to delivering the exception.

10 Claims, 6 Drawing Sheets

Related U.S. Application Data

No. 12/644,440, filed on Dec. 22, 2009, now Pat. No. 8,447,962.

(51) Int. Cl.
*G06F 9/38* (2018.01)
*G06F 9/30* (2018.01)

(56) References Cited

U.S. PATENT DOCUMENTS

| | | | |
|---|---|---|---|
| 4,961,161 A | 10/1990 | Kojima | |
| 5,182,811 A | 1/1993 | Sakamura | |
| 5,504,925 A | 4/1996 | Jeffs | |
| 5,511,210 A | 4/1996 | Nishikawa et al. | |
| 5,632,028 A | 5/1997 | Thusoo et al. | |
| 5,640,524 A | 6/1997 | Beard et al. | |
| 5,673,426 A | 9/1997 | Shen et al. | |
| 5,680,620 A | 10/1997 | Ross | |
| 5,745,770 A | 4/1998 | Thangadurai et al. | |
| 5,812,439 A | 9/1998 | Hansen | |
| 5,878,245 A | 3/1999 | Johnson et al. | |
| 5,933,618 A | 8/1999 | Tran et al. | |
| 5,966,529 A | 10/1999 | Sollars | |
| 6,006,030 A | 12/1999 | Dockser | |
| 6,044,454 A | 3/2000 | Schwarz et al. | |
| 6,049,876 A | 4/2000 | Moughanni et al. | |
| 6,131,158 A | 10/2000 | Matsuo et al. | |
| 6,374,345 B1 | 4/2002 | Juffa et al. | |
| 6,408,379 B1 | 6/2002 | Juffa et al. | |
| 6,542,988 B1 | 4/2003 | Tremblay et al. | |
| 6,615,343 B1 | 9/2003 | Talcott et al. | |
| 6,675,292 B2 | 1/2004 | Prabhu et al. | |
| 6,704,862 B1 | 3/2004 | Chaudhry et al. | |
| 6,742,113 B1 | 5/2004 | Yamada | |
| 6,795,937 B2 | 9/2004 | Harris et al. | |
| 7,210,027 B2 | 4/2007 | Suzuki et al. | |
| 7,216,218 B2 | 5/2007 | Wilson | |
| 7,437,521 B1 | 10/2008 | Scott et al. | |
| 7,502,277 B2 | 3/2009 | Wu et al. | |
| 7,707,393 B2 | 4/2010 | Wilson | |
| 7,882,339 B2 | 2/2011 | Jacobson et al. | |
| 7,966,480 B2 | 6/2011 | Catherwood | |
| 7,984,273 B2 | 7/2011 | Sprangle et al. | |
| 8,108,652 B1 | 1/2012 | Hui | |
| 8,892,848 B2 | 11/2014 | Sprangle et al. | |
| 9,747,101 B2 | 8/2017 | Ould-Ahmed-Vall et al. | |
| 9,753,889 B2* | 9/2017 | Sperber | G06F 15/8007 |
| 2003/0074530 A1 | 4/2003 | Mahalingaiah et al. | |
| 2004/0236920 A1 | 11/2004 | Sheaffer | |
| 2006/0129740 A1 | 6/2006 | Ruckerbauer et al. | |
| 2009/0172364 A1 | 7/2009 | Sprangle et al. | |
| 2012/0297110 A1* | 11/2012 | Kavi | G06F 12/0864 711/3 |
| 2013/0326160 A1* | 12/2013 | Sperber | G06F 9/30036 711/154 |
| 2014/0189308 A1* | 7/2014 | Hughes | G06F 9/30021 712/208 |
| 2014/0201498 A1* | 7/2014 | Ould-Ahmed-Vall | G06F 9/30036 712/4 |

OTHER PUBLICATIONS

Final Office Action from U.S. Appl. No. 13/250,223, dated Apr. 6, 2017, 15 pages.
Final Office Action from U.S. Appl. No. 13/250,223, dated May 21, 2015, 14 pages.
Non-Final Office Action from U.S. Appl. No. 13/250,223, dated Apr. 4, 2018, 11 pages.
Non-Final Office Action from U.S. Appl. No. 13/250,223, dated Dec. 18, 2014, 23 pages.
Non-Final Office Action from U.S. Appl. No. 13/250,223, dated Aug. 11, 2016, 16 pages.

* cited by examiner

GATHERING AND SCATTERING MULTIPLE DATA ELEMENTS

RELATED APPLICATIONS

This application is a continuation of co-pending U.S. application Ser. No. 13/898,189, filed May 20, 2013, which is a continuation of U.S. application Ser. No. 12/644,440, filed Dec. 22, 2009, now U.S. Issued U.S. Pat. No. 8,447,962, Issued on May 21, 2013, all of which is hereby incorporated by reference.

BACKGROUND

This disclosure relates to the field of processors.

To improve the efficiency of multimedia applications, as well as other applications with similar characteristics, Single Instruction, Multiple Data (SIMD) architectures have been implemented in microprocessor systems to enable one instruction to operate on several operands in parallel. In particular, SIMD architectures take advantage of packing many data elements within one register or contiguous memory location. With parallel hardware execution, multiple operations are performed on separate data elements by one instruction, typically resulting in significant performance advantages.

SIMD performance improvements may be difficult to attain in applications involving irregular memory access patterns. For example, applications storing data tables that require frequent and random updates to data elements, which may or may not be stored at contiguous memory locations, typically require rearrangement of the data in order to fully utilize SIMD hardware. This rearrangement of data can result in substantial overhead, thus limiting the efficiencies attained from SIMD hardware.

As SIMD vector widths increase (i.e., the number of data elements upon which the single operation is performed), application developers (and compilers) are finding it increasingly difficult to fully utilize SIMD hardware due to the overhead associated with rearranging data elements stored in non-contiguous memory storage.

The details of one or more embodiments of the invention are set forth in the accompanying drawings and the description below. Other features, objects, and advantages will be apparent from the description and drawings, and from the claims.

DETAILED DESCRIPTION

Figure 1:
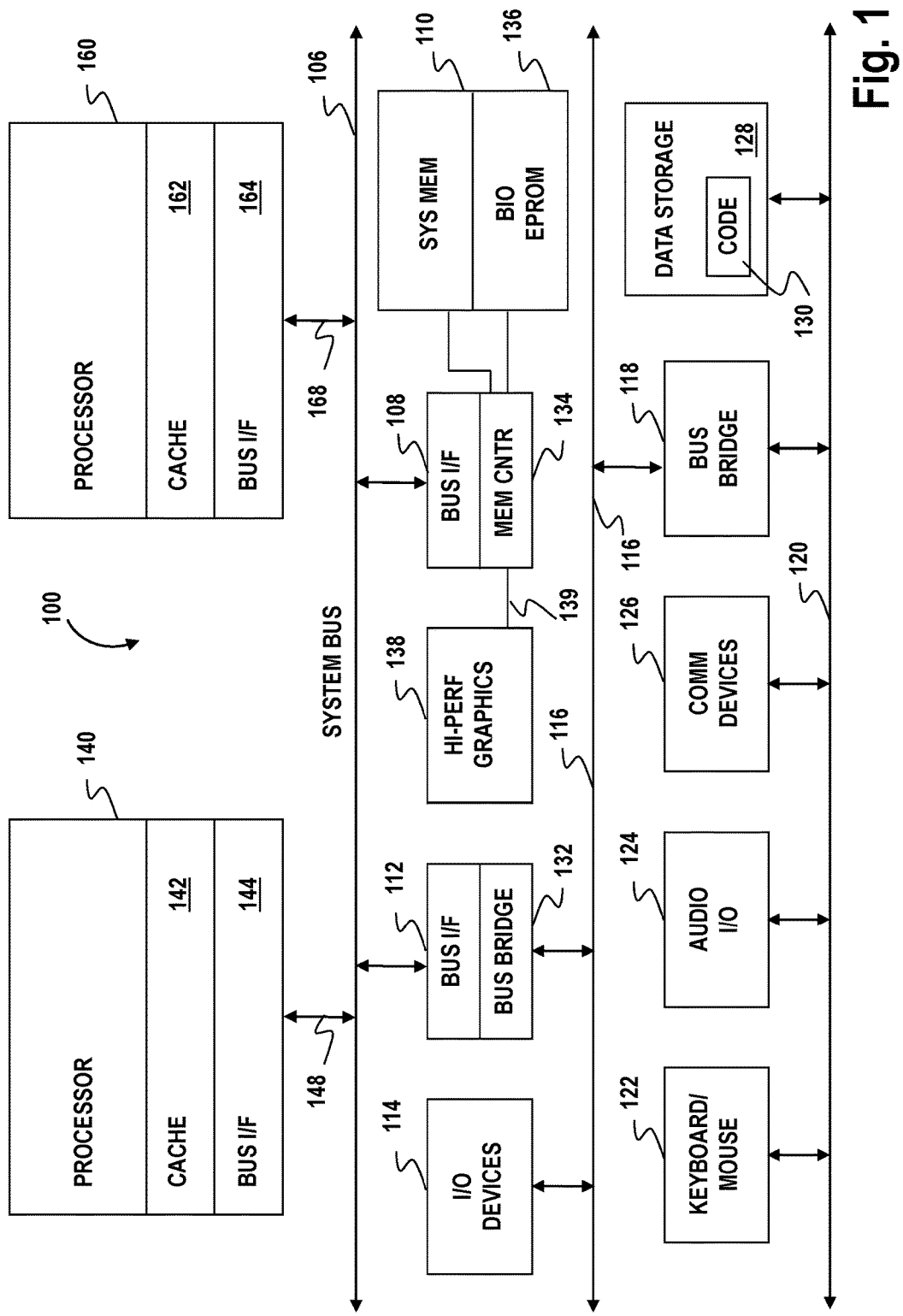
FIGS. 1 and 2 are schematic illustrations of computing systems.

Gather and scatter operations rearrange stored data elements for use by SIMD hardware. Gather operations read a set of data elements from memory and pack them together, typically into a single register or cache line. Scatter operations perform the reverse operation by dispersing data elements in a packed data structure to set of non-contiguous or random memory locations. In addition to the delays associated with accessing one or more levels of memory, interruptions during the gather or scatter operations, e.g., due to repeated page faults, may significantly increase the overhead associated with these operations since any progress made by the operation is typically discarded prior to returning to the beginning of the operation. U.S. Pat. App. No. 2009/0172364, portions of which have been incorporated herein, discloses gather, scatter, and prefetch implementations which, when interrupted, may save the state of the operation. Thus, when the operation is restarted, a repeat of the entire operation may not be required.

According to a first aspect, efficient data transfer operations can be achieved by: decoding by a processor device, a single instruction specifying a transfer operation for a plurality of data elements between a first storage location and a second storage location; issuing the single instruction for execution by an execution unit in the processor; detecting an occurrence of an exception during execution of the single instruction; and in response to the exception, delivering pending traps or interrupts to an exception handler prior to delivering the exception.

For the purpose of the following discussion of embodiments, implementations, and examples, illustrative terms are used. Definitions for certain such illustrative terms follow.

A computer system or data processing device or system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, and digital video or digital audio recorder/players.

A register is any device capable of storing and providing data. Further functionality of a register with respect to data formats is described below. A register is not necessarily, included on the same die or in the same package as the processor.

Terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. Further, the terms "exception" and "fault" are used interchangeably to refer to an event that causes suspension of the current operation. Types include addressing exception, data exception, operation exception, overflow exception, protection exception, underflow exception.

It should be understood that the teachings disclosed herein may be used in a variety of applications. Although not limited in this respect, the circuits and techniques disclosed herein may be used in many apparatuses such as personal computers (PCs), wireless devices or stations, video or digital game devices or systems, image collection, processing, generation, and/or visualizing systems or display, digital display system, communication system, and the like.

Figure 2:
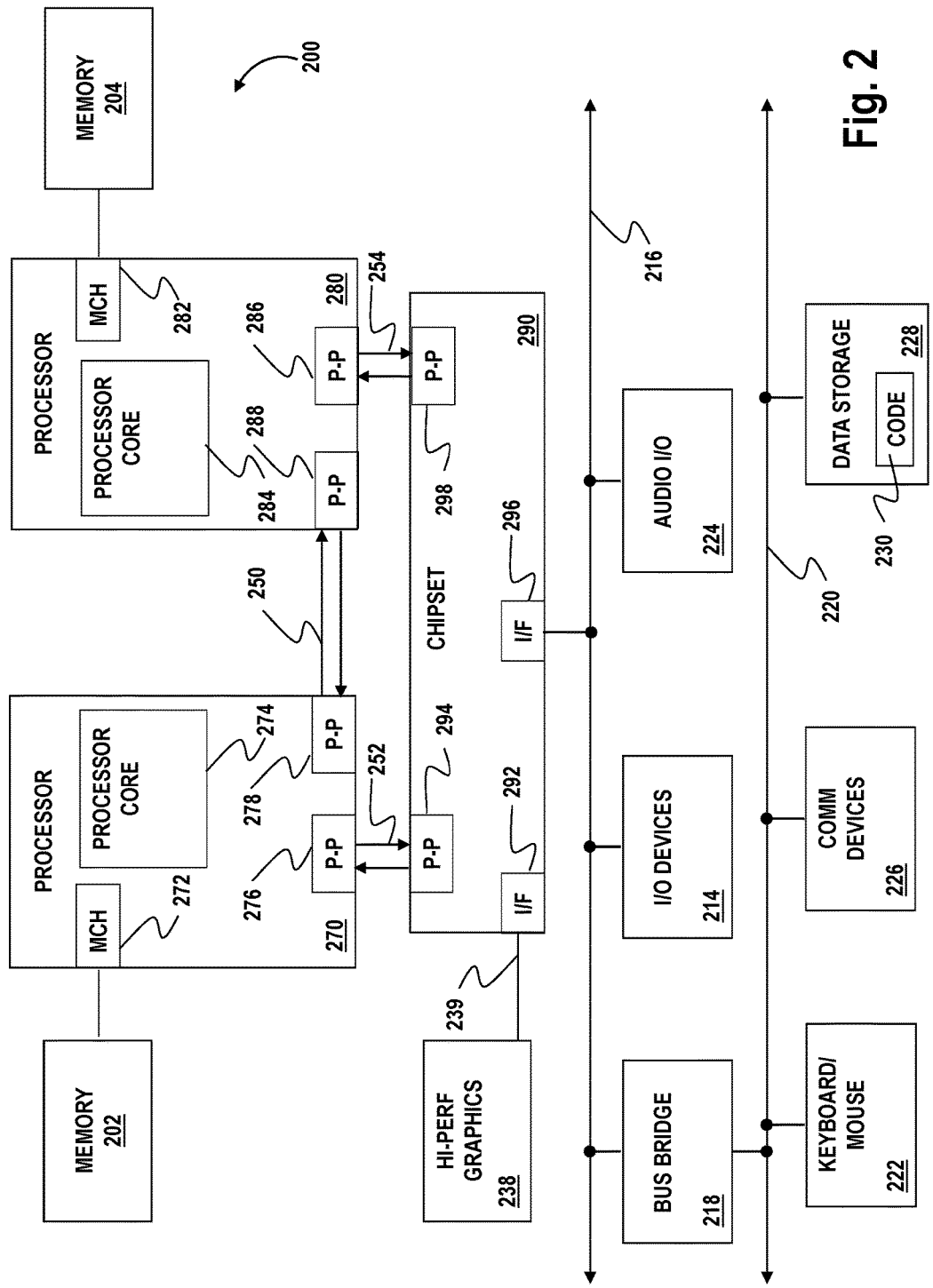

FIG. 1 shows a system including processors, memory, and input/output devices interconnected by a front side bus and/or a system bus. FIG. 2 shows a system including processors, memory, and input/output devices interconnected by a number of point-to-point interfaces. Other processor architectures may be used, and other techniques of communicating data within a processor may be used.

Referring particularly to FIG. 1, system 100 includes two processors 140 and 160 operable to perform a transfer operation for a plurality of data elements between a first and second storage location (e.g., vscatter, vgather, vscatterpf, and vgatherpf). Although only two are shown for clarity, system 100 can include more than two or only one processor. Processors 140 and 160 include level one (L1) caches 142, 162, provided for gathering or scattering data. In some embodiments, processors 140 and 160 are coupled to corresponding level two (L2) caches via a backside bus. The system in FIG. 1 has several functional units connected via bus interfaces 144, 164, 112, 108 via a system bus 106. In one embodiment, system bus 106 may be the front side bus (FSB) as used with Pentium® class microprocessors manufactured by Intel® Corporation. In other embodiments, other interconnects may be used.

In some implementations, other components perform gather, scatter, and/or prefetch operations between a first and second set of storage locations. For example, the system 100 includes a memory controller 134 that permits processors 140, 160 to read write, gather and/or scatter data to and from system memory 110. In some implementations, other components perform functions, such as gather functions, and other internal and external memories may be used. Other embodiments include a basic input/output system (BIOS) erasable programmable read-only memory (EPROM) 136 using flash memory. Memory controller 134 includes a bus interface 108 to permit memory read and write data to be carried to and from functional units coupled to the system bus 106. Memory controller 134 may also connect with a high-performance graphics circuit 138 across a high-performance graphics interface 139. In certain embodiments the high-performance graphics interface 139 may be an advanced graphics port AGP interface. Memory controller 134 may direct read data from system memory 110 to the high-performance graphics circuit 138 across high-performance graphics interface 139.

Referring now to FIG. 2, system 200 includes several processors, of which only two, processors 270, 280 are shown for clarity. Processors 270, 280 each include a local memory channel hub (MCH) 272, 282 to connect with memory 202, 204, for gathering and/or scattering data. Processors 270, 280 exchange data via a point-to-point interface 250 using point-to-point interface circuits 278, 288. Processors 270, 280 each exchange data with a chipset 290 via individual point-to-point interfaces 252, 254 using point to point interface circuits 276, 294, 286, 298. Chipset 290 may also exchange data with a high-performance graphics circuit 238 via a high-performance graphics interface 292.

In FIG. 1, bus bridge 132 permits data exchanges between system bus 106 and bus 116, which in some embodiments be an industry-standard architecture (ISA) bus or a peripheral component interconnect (PCI) bus. In FIG. 2, chipset 290 exchanges data with a bus 216 via a bus interface 296. In either system, there may be various input/output I/O devices 114, 214 on the bus 116, 216 (e.g., audio I/O 124, 224). Another bus bridge 118, 218 may in some embodiments be used to permit data exchanges between bus 116, 216 and bus 120, 220. Bus 120, 220 may in some embodiments be a small computer system interface (SCSI) bus, an integrated drive electronics (IDE) bus, or a universal serial bus (USB) bus. Additional I/O devices may be connected with bus 220. These may include for example keyboard and cursor control devices 122, 222, including mice, communications devices 126, 226, including modems and network interfaces, and data storage devices 128, 228. Software code 130, 230 is stored on data storage device 128, 228. Data storage device 128, 228 is a fixed magnetic disk, a floppy disk drive, an optical disk drive, a magneto-optical disk drive, a magnetic tape, or non-volatile memory including flash memory.

Figure 3:
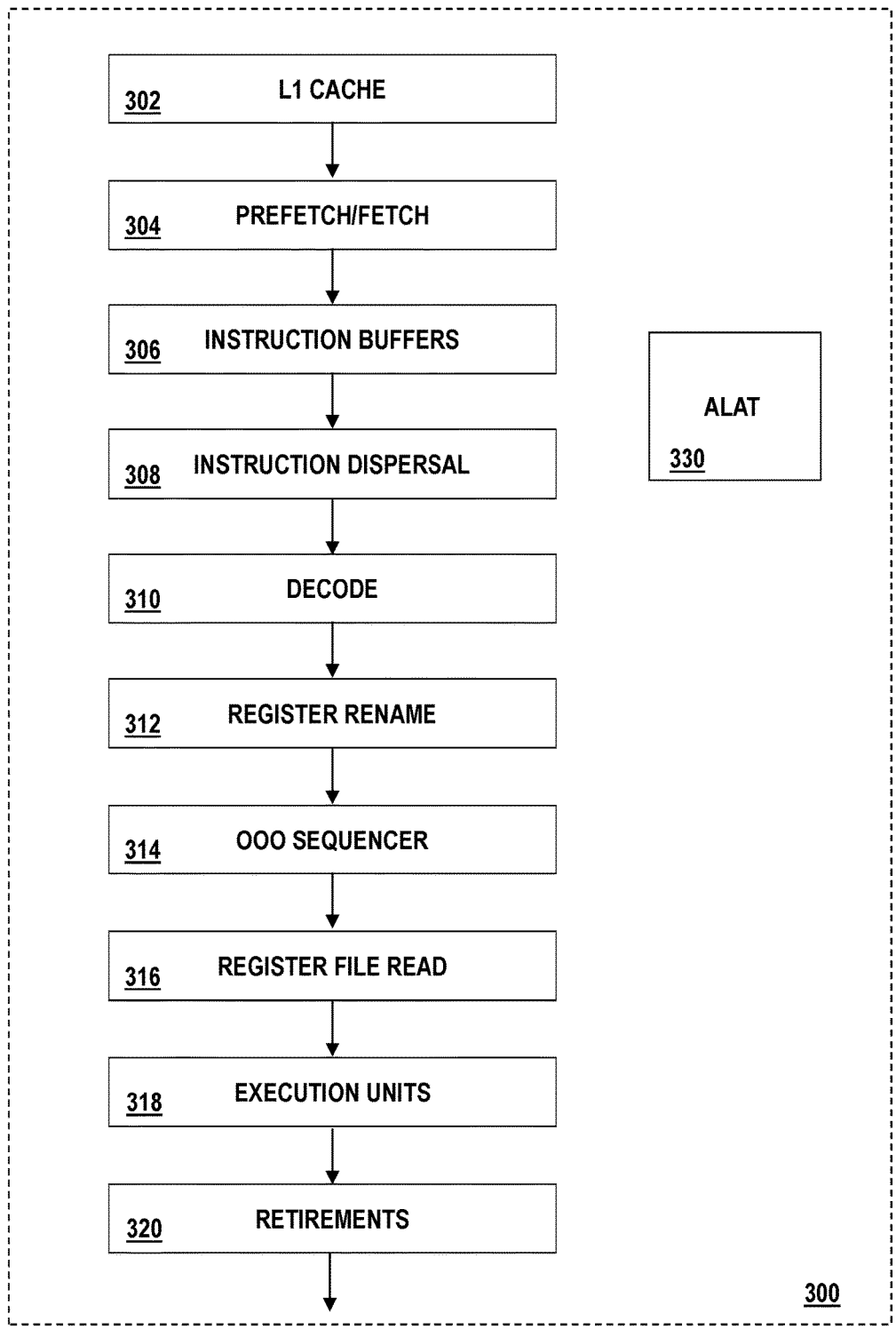
FIG. 3 is a block diagram of stages in a processor pipeline.

Referring to FIG. 3, processor pipeline 300 may be operated by the processors of FIG. 1 or 2, or other processors. Processor pipeline 300 is an out-of order pipeline. Other pipeline components or mechanisms may be used. A level one (L1) cache stage 302 stores instructions and/or data in a level one (L1) cache (142, 162 in FIG. 1). A prefetch/fetch stage 304 fetches and/or prefetches the instructions from the level one (L1) cache or another location. An instruction buffer stage 306 temporarily buffers the instructions in one or more buffers. An instruction dispersal stage 308 send the instructions down the pipeline. A decode stage 310 take a program-level instruction from a program and produces one or more machine-level instructions from the program instruction. A register rename stage 312 maps logical registers over to actual physical registers prior to execution. An out-of-order (OOO) sequencer stage 314 schedules the various machine instructions for execution based upon the availability of data in source registers. Those instructions whose source registers are waiting for data may have their execution postponed, whereas other instructions whose source registers have their data available may have their execution advanced in order. In some embodiments, they may be scheduled for execution in parallel.

A register file read stage 316 reads the physical (e.g., source) registers. An execution units stage 318 inputs the machine instructions into one or more execution units. The advanced load address table (ALAT) stage 330 modifies entries while executing machine instructions, such as, advanced load instructions, corresponding test instructions, and any intervening store instructions. A retirement stage 320 updates the machine state and writes to physical destination registers.

The pipeline stages shown in FIG. 3 are one example only, and may vary in both function and sequence in various processor pipeline embodiments. A processor used with embodiments disclosed herein need not use pipelining.

Figure 4:
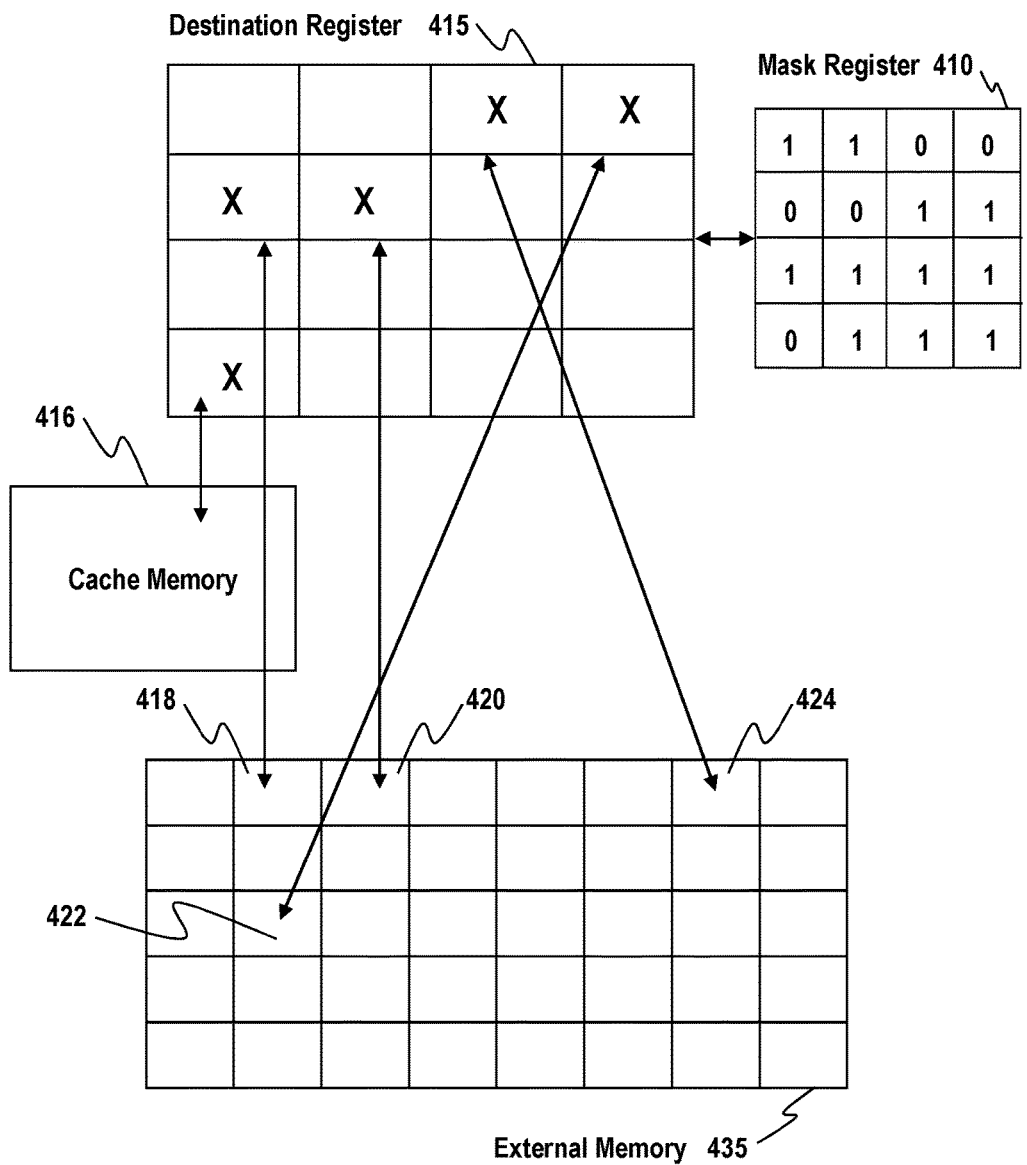
FIG. 4 is a schematic illustration of the flow of data in a system.

Referring to FIG. 4 data is stored in the systems described in reference to FIGS. 1 and 2, for example, in cache memory 416 and/or external memory 435. Data is gathered from and/or scattered to contiguous locations 418 and 420 and/or non-contiguous or non-adjacent locations 422 and 424 (e.g., in external memory 435).

Cache memory 416 is typically internal to a processor, and external memory 435 is typically external to a processor (e.g., processors 140, 160, 270, and/or 280, each described in reference to one of FIGS. 1 and 2). However, in various embodiments, each of cache memory 416 and/or external memory 435 may be internal or external to a processor. External memory 435 may include or be analogous to, for example, 202, 204, 110 or other memories.

A gather operation reads data from two or more non-contiguous memory locations 422 and 424 (e.g., in external memory 435) and stores the data contiguously to a register memory, such as destination register 415. The status of the gathering of the data to destination register 415 is recorded or written to a mask register 410. Similarly, a scatter operation loads data from a register memory, such as destination register 415, and stores the data to two or more non-contiguous memory locations 422 and 424 (e.g., in external memory 435). The status of scattering the data to destination register 415 is recorded or written to a mask register 410.

Register memories (e.g., destination, mask and/or other register memories) may be relatively small storage spaces typically within a processor. The contents of register memories are accessed more quickly than content stored in other storage units of the processor. Destination register 415 (e.g., a load register) may be a counter machine, a pointer machine, a random access machine (RAM), a random access stored program machine model (RASP) or other memories. Mask register 410 (e.g., a shadow register) has data fields, elements, or placeholders, holding '0' and '1' flags or values, shadowing or tracking the state or storage capacity of destination register 415.

Gather and scatter operations may be implemented to access data elements, particularly in applications having widely dispersed data elements. The dispersed data elements may be gathered for storing in a contiguous manner or in a single location, for example, in destination register 415 and/or scattered to two or more non-contiguous memory locations. In one embodiment, a gather instruction reads, copies, replicates, transfers, or contiguously writes each data element from two or more non-contiguous memory locations 422 and 424 (e.g., in cache memory 416 and/or external memory 435) to destination register 415, and vice versa with regard to the scatter instruction. Such gather processes are referred to as "packing" data elements and/or "packing" destination register 415. By packing data elements into a single location (e.g., destination register 415), a processor (e.g., FIGS. 1 and 2) may load, process, monitor or otherwise use the data collectively, simultaneously, in unison, and/or in sequence for executing operations on the data in a minimal number of cycles (e.g., one cycle).

Gather and/or scatter operations may be interrupted, possibly because attempts to access the non-contiguous memory locations delay the progress of the respective operation. In some embodiments, the state of the gather and/or scatter operations is saved. Thus, when the operation is restarted, a repeat of the entire gather and/or scatter operation is not required. Storing a record of which data elements have been and have not been gathered or scattered in, for example, mask register 410, allows the operation to continue from the point of interruption.

The gather operation may gather (e.g., read or access) each of a set of (e.g., 16) data elements from two or more contiguous or non-contiguous memory locations in cache memory 416 and/or external memory 435. A gather operation uses as an input or includes a pointer to a cache line in cache memory 416. When data is spread across a cache line boundary, or no cache line address is provided, the gather operation retrieves the data from external memory 435 which may take a relatively long time. For each data element, the gather operation is pointed to cache memory 416 and if the gather is unsuccessful, proceeds to access the data from external memory 435. In some embodiments, the operation skips cache memory 416 and proceeds to access external memory 435 directly.

The gather operation stores or packs data elements into destination register 415 (e.g., a load register). The destination register 415 includes multiple (e.g., 16) separate data elements, for example, used for a single gather operation.

The data elements or vectors in destination register 415 include data copied from the memory from which the data element was retrieved and/or pointers to the memory location from which the data element were retrieved.

The gather operation accesses cache memory 416, local memory or memory internal to a processor to read or retrieve each data element before accessing external memory 435. The data elements are arranged in cache memory 416 in memory pages or other units of a memory. The data elements are packed in memory (e.g., in contiguous memory locations 418 and 420) or alternately they are stored in non-contiguous or non-adjacent locations (e.g., in non-contiguous memory locations 422 and 424). Typically, the gather operation is used when the two or more data elements are stored in noncontiguous or non-adjacent memory locations 422 and 424. Data elements may be bytes (e.g., 8 bits), words (e.g., 2 bytes), double words (e.g., 32 bits) or other sizes or units of data.

The rate of a gather operation depends on a level of coherence of the gathered elements. For example, the level of coherence of the gathered elements is a measure of on how many different cache lines in which the data elements are stored, for example, in cache memory 416. Elements stored with greater coherence (e.g., stored using fewer cache lines in cache memory 416) are gathered or retrieved in less time or in fewer operational cycles. For example, when all the data elements are fully coherent (e.g., on the same cache line), the gather operation retrieves the data in a single cycle. However, gathered elements may not be fully coherent. For example, the elements may be dispersed on several (e.g., 2 or 3) cache lines, and therefore may be gathered in several (e.g., 2 or 3) accesses to (e.g., the level 1 (L1) or central processing unit (CPU)) cache memory 416.

Destination register 415 may be a vector register, load register or other register memory for temporarily storing or packing data accessed or gathered from two or more non-adjacent memory locations. For example, for a set of data (e.g., 16 vectors), destination register 415 may be the destination of a gather operation and cache memory 416 and/or external memory 435 may be the sources (e.g., which may be contiguous 418 and 420 or non-contiguous 422 and 424).

Figure 5:
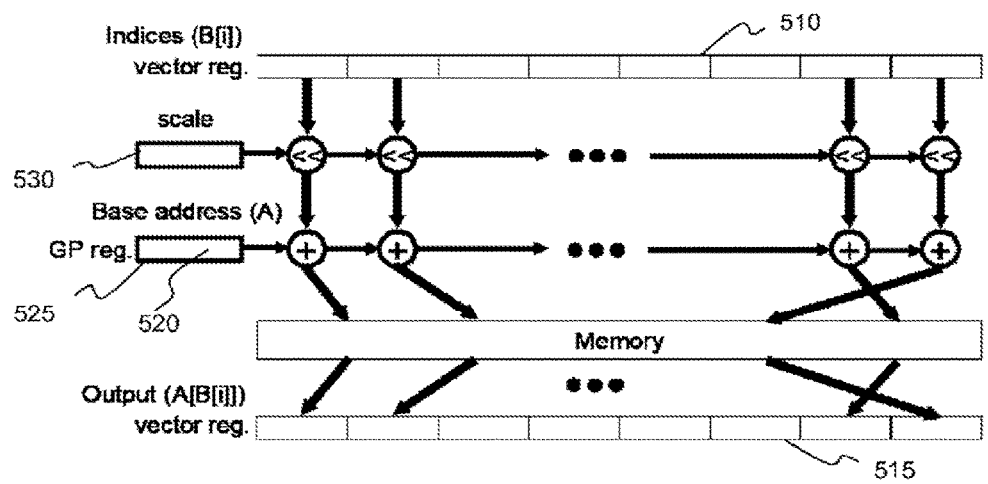
FIG. 5 illustrates an example of the flow of data in a gather operation.

FIG. 5 illustrates one embodiment in which a gather instruction conditionally loads a set of data elements (e.g., up to sixteen 32-bit or eight 64-bit floating-point data elements for 512-bit SIMD) and packs them into a destination register 515. The elements are specified via a base address 520 passed in a general-purpose register 525, a scale 530 passed as an immediate, an index register 510 passed as a SIMD register (holding packed indices), and an optional displacement (not shown). Data elements will only be loaded if their corresponding mask bit is one. The mask register in this implementation is a dedicated mask register, alternatively the mask register may be a SIMD register, and the mask bit for an element is the sign bit of the corresponding element from the mask register. Mask elements are treated as the same size as index elements. If an element's mask bit is not set, the corresponding element of the destination register (a SIMD register) is left unchanged. Upon completion of the gather operation, the entire mask register is set to zero by the gather instruction unless its execution is interrupted by an exception.

In one embodiment, when a gather operation for gathering a predetermined set of data is terminated before completion, destination register 515 temporarily stores or preserves the data already collected (e.g., a partial subset of the predetermined set of data).

The following pseudo-code includes demonstrative examples of operations described herein. Other pseudo-code, languages, operations, orders of operations, and/or numbers may be used.

The following pseudo-code illustrates an example of how a gather instruction (e.g., written 'vgather') may operate.

```
vgather DEST, [BASE_ADDR + SCALE * VINDEX + DISP], MASK
    VECTOR_LENGTH is the width of SIMD register DEST (in
        bits).
    ELEMENT_SIZE is the size of a data element (in bits).
    INDEX_SIZE is the size of an index element (in bits).
    DISP is the optional displacement.
    MaskBit(j) is the jth element's mask bit. For architectures with
        dedicated mask registers, this is
    MASK[j]. For others, this is MASK[(j+1)*INDEX_SIZE-1].
FOR j ← 0 TO VECTOR_LENGTH / MAX(ELEMENT_SIZE,
INDEX_SIZE) - 1
    i ← j*ELEMENT_SIZE
    k← j*INDEX_SIZE
    DEST[i+ELEMENT_SIZE-1:i] ← if MaskBit(j) then
    MEM[BASE_ADDR +
SignExtend(VINDEX[k+INDEX_SIZE-1:k]) * SCALE + DISP] else
DEST[i+ELEMENT_SIZE-1:i]
ENDFOR
DEST[VECTOR_LENGTH-1: VECTOR_LENGTH/
MAX(ELEMENT_SIZE, INDEX_SIZE) *
ELEMENT_SIZE] = 0
MASK ← 0
```

Figure 6:
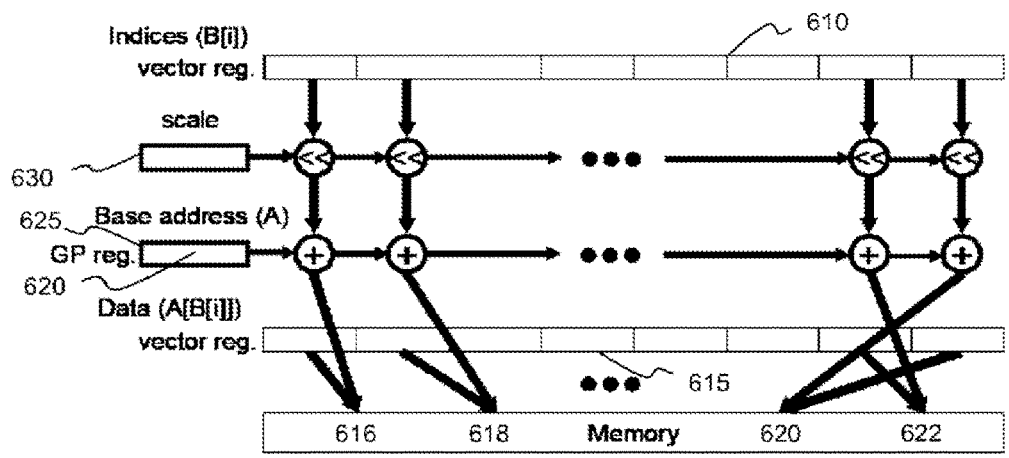
FIG. 6 illustrates an example of the flow of data in a scatter operation

FIG. 6 illustrates one embodiment in which a scatter instruction conditionally stores a set of elements from a source SIMD register 615, ordering writes to any overlapping destination memory locations from LSB to MSB of the source. The destination memory locations 616, 618, 620, and 622 are specified as described above for the gather instruction. Elements will only be stored if their corresponding mask bit is one. The entire mask register will be set to zero by execution of the gather instruction unless the gather instruction triggers an exception. This instruction can be suspended by an exception if at least one element is already scattered (just as the gather instruction above). In some implementations, only writes to overlapping destination locations are guaranteed to be ordered with respect to each other (from LSB to MSB of the source registers). Overlap is determined as follows. Each element corresponds to a set of byte-sized locations, [(index*scale):(index*scale+data element size−1)]. If any two locations from two different elements are the same, the elements overlap. Writes that are not overlapped may occur in any order. In some embodiments, if two or more destination locations completely overlap, the "earlier" write(s) may be skipped. In some implementations, elements may be scattered in any order (if there is no overlap), but faults must be delivered in a right-to-left order.

The following pseudo-code illustrates an example of how a scatter instruction (e.g., written 'vscatter') may operate.

```
vscatter [BASE_ADDR + SCALE * VINDEX + DISP], SRC, MASK
    VECTOR_LENGTH is the width of SIMD register SRC (in
        bits).
    ELEMENT_SIZE is the size of a data element (in bits).
    INDEX_SIZE is the size of an index element (in bits).
    DISP is the optional displacement.
    MaskBit(j) is the jth element's mask bit. For architectures with
        dedicated mask registers, this
    is MASK[j]. For others, this is MASK[(j+1)*INDEX_SIZE-1].
FOR j ← 0 TO VECTOR_LENGTH / MAX(ELEMENT_SIZE,
INDEX_SIZE) - 1
    i ← j*ELEMENT_SIZE
```

-continued

```
    k← j*INDEX_SIZE
    if MaskBit(j) then MEM[BASE_ADDR +
    SignExtend(VINDEX[k+INDEX_SIZE-1:k]) * SCALE +
DISP] ← SRC[i+ELEMENT_SIZE-1:i]
ENDFOR
MASK ← 0
```

Referring again to FIG. 4, scatter/gather prefetch instructions (e.g., vscatterpf and vgatherpf) may be defined similarly to the vgather instruction, but instead of loading data into destination register 415, the cache line having the data may be prefetched into cache memory 416. In one embodiment, the data is first prefetched into cache memory 416, before being gathered or scattered in order to avoid paying a cache miss penalty. In some embodiments, the instructions take a hint as to which level of cache the data should be prefetched into. Gather prefetches may carry a hint that the data being prefetched will be subsequently read (as opposed to written). Scatter prefetches may carry a hint that the data being prefetched will be subsequently written. In one embodiment, the gather and/or scatter prefetch instructions do not modify the mask register. To guarantee forward progress, in this embodiment, this instruction is not suspended on exceptions, and does not deliver page faults.

The gather and/or scatter operations may be stopped or interrupted for a variety of reasons. For example, a context switching device may switch register contexts, task contexts, or process contexts (e.g., for changing a state or context of a processor between two or more of multiple tasks). In another embodiment, the operations may be stopped or interrupted when one or more precise exceptions substantially impedes or slows down the specified operation (e.g., a maximal number or limit of allowable page faults or cache page misses for an operating system (OS) may be encountered) and/or the time allotted to the operation expires. In yet another embodiment, the gather/scatter operation may be stopped or interrupted when the operation is replaced by a higher priority operation.

A gather and/or scatter operation may be impeded, for example, when attempting to retrieve data from problematic memory locations in a system resulting in page faults. Some fault conditions such as page faults are handled so that the program flow is capable of resuming the faulting instruction (e.g., retrieving the data) while guaranteeing forward progress of a corresponding set of instructions. In one embodiment, a memory page includes a fixed length block of cache memory 416 that is used as a unit of transfer between destination register 415 and other memories, such as, external memory 435, a hard-drive or disk. A page fault include an interrupt (e.g., or an exception), for example, when a gather or scatter operation accesses a memory page that is mapped in address space, but not physically loaded or available in cache memory 416. For example, each data element being gathered from cache memory 416 may cause a page fault and each element that crosses a boundary of a memory page may cause two page faults.

In one embodiment, a system stops or interrupts the specified operation, for example, when a maximal number of allowable exceptions, such as, (e.g., greater than or equal to 16) page faults are encountered. For example, the OS may have a limit for cache and/or page misses or faults for an operation. The OS may include exception handling software to handle the page faults and a processor may include a memory management unit for detecting page faults. Other exception handling mechanisms may be used.

When a page fault is encountered, a system may stop the gather and/or scatter operation in mid-process in order to handle the page fault. If any progress made by the operation is discarded when the operation is repeated and page faults are repeatedly encountered, the gather/scatter operation will be unable to make any forward progress.

Storing data gathered from cache memory 416 and/or external memory 435 in destination register 415 preserves the data in case the complete gather operation (e.g., gathering all 16 vectors) is interrupted, fails or terminates before completion. In particular, if a data element generates an exception, these instructions update a subset of elements before delivering the exception (i.e., the mask register and the destination register, for gather operations, or memory, for scatter operations, have a subset of elements written before the exception is delivered). By storing data elements that have been gathered in destination register 415, the data previously collected by an interrupted or stopped gather operation is preserved and the gather operation restarts where the operation previously completed before the interruption.

The interrupted gather operation (e.g., having gathered one or more data elements) may start gathering the remaining elements missing from destination register 415.

In the case of a gather instruction, if the same architectural register is used as both an input and output, some input states may be lost since the output registers may be partially updated on an exception, and since the indices may be a different size than the data elements. In some embodiments, a gather instruction will deliver a fault if the index and/or mask registers specified in the instruction are the same as the destination register to prevent the loss of input data for the instruction.

In some embodiments, data elements may be read from memory in any order while faults are delivered in a right to left (i.e., LSB to MSB) manner with regard to the order of data elements in destination register 415. The gather instruction can be suspended by an exception if at least one element is already gathered (i.e., if the exception is triggered by an element other than the rightmost one with its mask bit set). If a fault is triggered by an element and delivered, all elements that are closer to the LSB of the destination register 415 will be gathered, if non-faulting, into the destination register and their mask bits updated. Data elements that are closer to the MSB of the destination register 415 may or may not be gathered. If a given data element triggers multiple faults, they will be delivered in the conventional order. Thus, when a gather operation is interrupted, the destination register and the mask register are partially updated; those elements that have been gathered are placed into the destination register and have their mask bits set to zero.

In some applications, particularly while coding and/or debugging software, data breakpoints may be used to halt program execution when the value of a variable changes, or when a variable is referenced. If the gather or scatter instructions trigger both a data breakpoint and an exception, conventional architectures would deliver the exception and the data breakpoint would be lost (since the instruction would partially update architectural state and not re-do the load/store that triggered the breakpoint). In order to reliably deliver data breakpoints even in the presence of exceptions, the instruction may be suspended (at the operation to the immediate right of the faulting element) if any traps are pending when an exception is triggered. This guarantees that data breakpoints are all serviced since they are treated as traps, while exceptions are handled as faults. With this mechanism, no data breakpoints will be lost, and forward progress is guaranteed (assuming fault handlers clear fault conditions). This mechanism is different than that used for repeated string operations. For example, string operations can be suspended by both traps and exceptions; traps alone will not suspend these gather/scatter instructions (instead, if there are no exceptions, traps will be delivered at the end of the instruction execution, like most other instructions).

In some embodiments, if any traps or interrupts are pending from already gathered elements, they will be delivered in lieu of the exception. In this case, a flag bit, e.g., EFLAG.RF, may be set to one so an instruction breakpoint is not re-triggered when execution is continued.

In some embodiments, mask register 410 is implemented to monitor and/or control the gathering of a predetermined set of data elements and the packing of destination register 415. Mask register 410 may be a shadow register, a control register, a flag register, a general purpose register, a SIMD register, or other appropriate register. Mask register 410 provides an indication of the data stored in destination register 415 and thus, may be used to track the completion of the gather operation. In one embodiment, there is a one-to-one correspondence between data elements stored in destination register 415 and corresponding state elements stored in mask register 410. State elements or values may include flags, markers, tabs, indicators, signals, and or other numbers, bits and/or codes for indicating whether of not a corresponding data element (e.g., in a corresponding or pointed register location) is stored in destination register 415. For example, a "1" in mask register 410 may indicate that a corresponding data element was not written into destination register 415; otherwise a "0" may be used. Other numbers or flags may be used.

In one embodiment, a processor may call the gather and/or scatter operations once using a single instruction call for a set of memory locations. The gather operation may execute or run until all data elements have been gathered and/or the total value of the register state elements is zero. Since a filled or packed destination register 415 of any size (e.g., for any number of gathered elements or instructions) results in an empty or zero mask register 410 after completion of the operation (e.g., regardless of the size of destination register 415), mask register 410 may be used to monitor the packing of any size destination register 415 (e.g., with any number of gathered elements). For example, the total sum of any number of "0" state elements will always be zero. Thus, mask register 410 may be used to monitor the packing or gathering of a variable number of data elements into destination register 415.

In some embodiments, other mask values are used to represent the completion of the transfer. For example, in an alternate embodiment, a "1" in mask register 410 indicates that a corresponding data element is written into destination register 415; otherwise mask register 410 stores a "0" in the corresponding mask location. In such embodiments, the gather instruction may execute until the sum of the values of the state elements in mask register 410 is equal to a predetermined threshold, for example, the number of data elements to be gathered, which may vary for each gather instruction. In some embodiments, the specified operation is executed until a logical operation (e.g., AND or OR) on the mask elements within mask register 410 results in a predetermined value (e.g., "0" or "1").

In one embodiment, the gather and/or scatter instructions executes or runs until a flag indicates that mask register 410 is cleared, zero, or another predetermined value (e.g., the number of elements to be gathered for the gather instruction). In one embodiment, a completion mask signals or flags when the operation is complete.

In one embodiment, in each operation cycle, the gather instruction reads a different one of the cache lines from (e.g., L1) cache memory 416 and fills a maximum number of elements in destination register 415 corresponding to the cache line read. For example, if the cache line read has one element to be gathered, then one element may be written into destination register 415 and the corresponding one bit state elements in mask register 410 may be set to "0". In some embodiments, when dual or multiple ported cache memory 416 and/or external memory 435 are used, a processor gathers more than 1 data element per cycle, in which case the gather operation for gathering a predetermined set of data elements executes in fewer cycles or iterations.

An efficient gather operation may be implemented in a system using a combination of microcode and/or hardware mechanisms. In one embodiment, a processor may continue the gather operation until a predetermined set of data has been completely gathered into destination vector register memory 415.

Several aspects of computations involved in the implementation of the instructions disclosed herein include: (1) generating addresses using the base address, indices, scale, and displacement, (2) loading/storing the data elements, and (3) packing/unpacking the data elements from the destination/source register. A range of embodiments is possible for each of these, including software emulation, microcode using existing uops, microcode using new uops (i.e., special hardware support for that part of the instruction), and a finite state machine (FSM).

Figure 7:
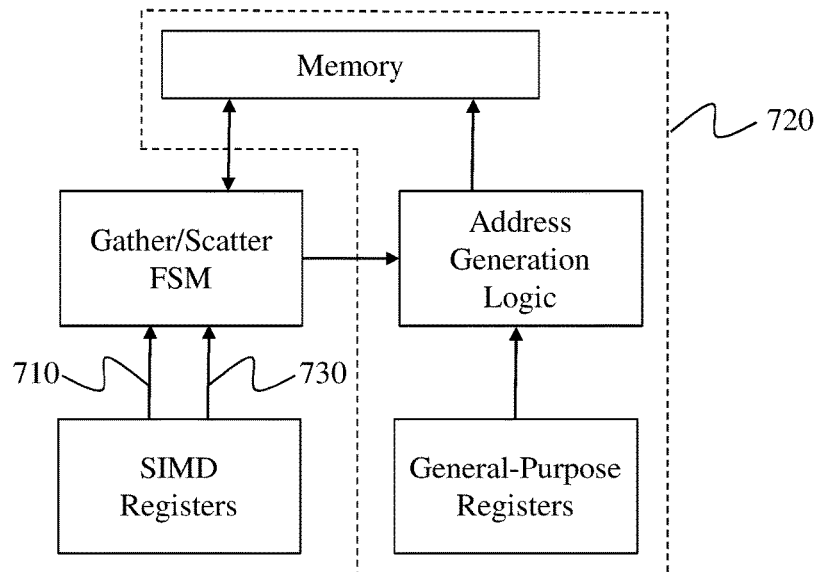
FIG. 7 illustrates a finite state machine for packing/unpacking and to assist in address generation, and microcode for the loads/stores.

Referring to FIG. 7, one embodiment to provide these computations includes a finite state machine ("FSM") for packing/unpacking and to assist in address generation, and microcode for the loads/stores. In step 710, the index register and the mask register (and source register for scatters) are sent to the Gather/Scatter FSM, which allocates resources for the instruction and stores a copy of these registers. Although the mask register in the illustrated embodiment is a SIMD register, masks may be provided to the FSM from other storage locations including, for example dedicated mask registers, general purpose registers, etc. In step 720, a set of SIMD-width special load/store uops are executed by the processor. For these special loads/store uops, the address generation hardware receives the base address from a general-purpose register and the index from the Gather/Scatter FSM (which sends one element's index per load/store uop). For scatters, the FSM also sends a data element from the source register for each store uop. For gathers, memory returns a data element for each load uop, which the hardware sends to the FSM. In some implementations, the source for the scatter operation is a cache line or other storage location. The hardware also provides a scale value and, in some embodiments, a displacement value, to the address generation logic via the same mechanism used for regular loads/stores. In step 730, the FSM writes the updated mask value back to the register file (and for gathers, the FSM also writes the destination value). An alternative embodiment may use a Gather/Scatter FSM to perform all three pieces of the computation, and therefore may not use load/store uops.

If loading/storing operations were performed using regular loads and stores, the implementation would require as many loads/stores as data elements. Thus, implementations may include a loop over all the data elements (e.g., software loop, microcode loop, or state machine "loop") or may not rely on looping (e.g., a set of SIMD-width load/store uops in microcode). In addition, some implementations may be configured to perform the operations for some or all of the operations simultaneously.

Some embodiments may include multiple implementations and a mechanism to dynamically choose the one predicted to provide better performance. In some implementations, performance depends on the number of cache lines touched by a gather/scatter instruction. For example, one possible microcode implementation of gather consists of a loop around a uop that loads a cache line where one of the elements resides and also extracts all other elements on that line. Such an implementation is faster when the elements reside on a smaller number of cache lines. If this implementation needs to touch a large number of cache lines, a simpler implementation that simply loads one data element at a time (with no looping) may be faster—the implementation with the loop incurs overhead from the loop uops. Thus, one embodiment may include both implementations, as well as a predictor to choose the implementation expected to perform better.

Figure 8:
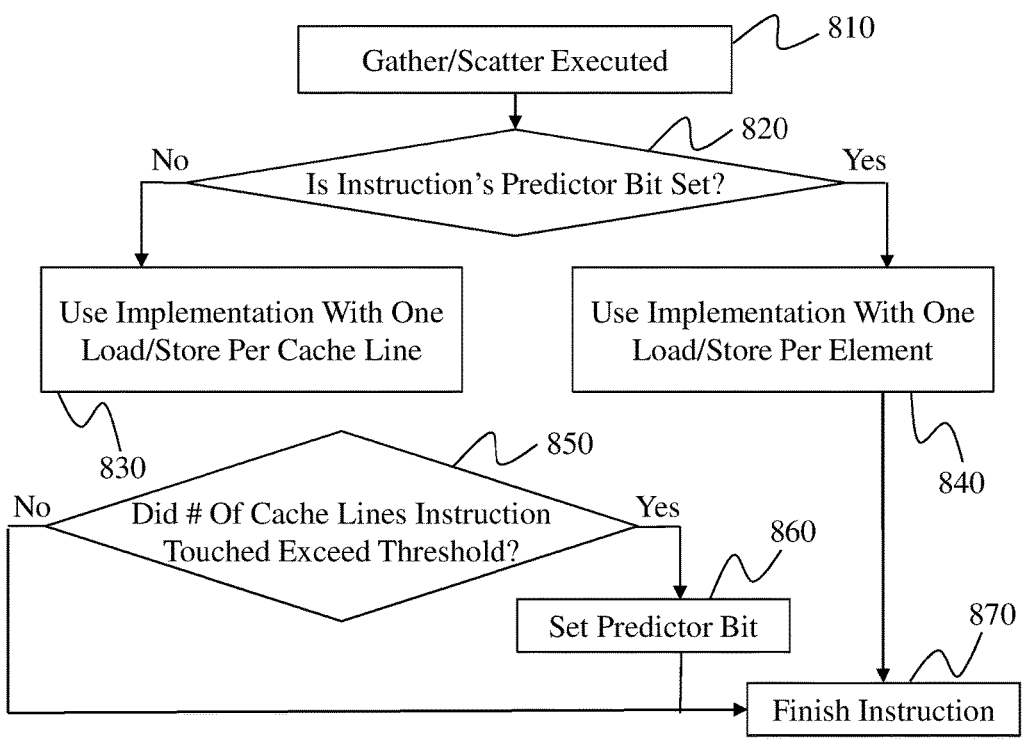
FIG. 8 is a flow diagram of an example implementation for a dynamic gather/scatter mechanism.

FIG. 8 illustrates one example of an Gather/Scatter FSM according to one embodiment using a predictor bit to control which of two implementations to use when executing a gather or scatter operation. The predictor is an instruction pointer indexed table ("IP-indexed table") with a single bit per static gather/scatter instruction to control which implementation to use. In one embodiment, the bits are all cleared every N cycles. In an alternative embodiment, a logic in implementation 840 counts how many cache lines are touched; if the number of cache lines touched is below a threshold, the logic may clear the corresponding bit. In operation, when a gather/scatter executes 810, if its bit in the table is clear 820, the hardware uses the looping implementation 830 (otherwise, it uses the other implementation 840). If, when using the looping implementation 830, the instruction touches a number of cache lines above some threshold 850, the hardware sets the predictor bit for that instruction 860. Thus, the hardware will choose to use the non-looping implementation the next time that gather/scatter instruction is executed.

Embodiments may include a computer readable medium, such as for example a memory, a disk drive, or a universal serial bus (USB) flash memory, or the various storage and memory devices shown in FIGS. 1 and 2, including or having stored thereon instructions which when executed by a processor or controller, carry out methods disclosed herein.

A number of embodiments, implementations, and examples have been described. Nevertheless, it will be understood that various modifications may be made without departing from the spirit and scope of the invention. For example, gather and scatter operations may be performed between memory locations (i.e., between cache lines, cache levels, and/or between internal and external memory), as opposed to between memory and registers. Further, gather and scatter operations may be performed between two or more registers. Accordingly, other embodiments are within the scope of the following claims.

What is claimed is:
1. A processor comprising:
   a destination register to store a plurality of data elements;
   a source register to store a plurality of index values, each of which corresponds to one of the plurality of data elements;
   a base address register to store a base address;
   a mask register to store mask values, each mask value corresponding to one of the plurality of data elements;

a decoder to decode a vector gather instruction, the vector gather instruction having a scale field to specify a common scaling factor to be applied to the index values; and execution circuitry coupled to the decoder, the execution circuitry to perform operations associated with the vector gather instruction, the operations comprising conditionally accessing, based on corresponding mask values, one or more of the plurality of data elements and storing the one or more of the plurality of data elements in the destination register;

wherein the execution circuitry is to scale the index values in accordance with the scale field to generate a corresponding plurality of scaled index values, and add the base address to each of the scaled index values to generate a corresponding plurality of non-contiguous system memory addresses for the data elements to be accessed and stored in the destination register.

2. The processor of claim 1 wherein system memory addresses are determined by adding a displacement value to the combination of the base address and the scaled index values.

3. The processor of claim 1 further comprising:
a plurality of cores, wherein the destination register, source register, base address register, mask register, decoder, and execution circuitry are integral to a first core of the plurality of cores.

4. The processor of claim 1 further comprising:
fetch circuitry and/or prefetch circuitry to fetch and/or prefetch the vector gather instruction from a system memory.

5. The processor of claim 3 further comprising:
a memory controller to couple the cores to a system memory.

6. The processor of claim 1 further comprising:
register rename circuitry to map one or more logical registers to physical registers of a register file.

7. The processor of claim 3 further comprising:
a level 1 cache integral to the first core to store instructions and data.

8. The processor of claim 1 further comprising:
a first interconnect to couple the processor to one or more system components.

9. The processor of claim 2 further comprising:
a second interconnect to couple the processor to one or more other processors.

10. The processor of claim 9 further comprising:
a third interconnect to couple the processor to a system memory.

* * * * *